United States Patent
Ono et al.

(10) Patent No.: US 11,499,445 B2
(45) Date of Patent: Nov. 15, 2022

(54) CO2 TURBINE POWER GENERATION SYSTEM

(71) Applicant: TOSHIBA ENERGY SYSTEMS & SOLUTIONS CORPORATION, Kawasaki (JP)

(72) Inventors: Takahiro Ono, Ota Tokyo (JP); Takahiro Yamamoto, Yokohama Kanagawa (JP); Koki Nishimura, Kawasaki Kanagawa (JP); Tomomi Okuyama, Ota Tokyo (JP); Tsuguhisa Tashima, Yokohama Kanagawa (JP); Shogo Iwai, Ota Tokyo (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/335,385

(22) Filed: Jun. 1, 2021

(65) Prior Publication Data

US 2021/0381391 A1    Dec. 9, 2021

(30) Foreign Application Priority Data

Jun. 5, 2020    (JP) .............................. JP2020-098597

(51) Int. Cl.
*F02C 3/34*    (2006.01)
*F01D 15/10*    (2006.01)
*F02C 6/10*    (2006.01)

(52) U.S. Cl.
CPC ................ *F01D 15/10* (2013.01); *F02C 3/34* (2013.01); *F02C 6/10* (2013.01); *F05D 2210/12* (2013.01); *F05D 2260/61* (2013.01)

(58) Field of Classification Search
CPC .... F01D 15/10; F02C 3/34; F02C 6/10; F05D 2210/12; F05D 2260/61
See application file for complete search history.

(56) References Cited

U.S. PATENT DOCUMENTS

| | | | |
|---|---|---|---|
| 9,097,187 B2 * | 8/2015 | Rofka | F02C 3/34 |
| 2012/0319410 A1 * | 12/2012 | Ambrosek | F02C 6/10 |
| | | | 290/1 R |
| 2014/0216034 A1 * | 8/2014 | Numata | F02C 3/34 |
| | | | 60/670 |
| 2015/0027099 A1 | 1/2015 | Iwai | |
| 2015/0121898 A1 | 5/2015 | Tashima | |
| 2020/0284194 A1 | 9/2020 | Iwai | |

FOREIGN PATENT DOCUMENTS

| | | |
|---|---|---|
| JP | H11-270349 A | 10/1999 |
| JP | 2014-037825 A | 2/2014 |
| JP | 2015-025418 A | 2/2015 |

* cited by examiner

*Primary Examiner* — Steven M Sutherland
(74) *Attorney, Agent, or Firm* — Foley & Lardner LLP

(57) ABSTRACT

The invention provides a $CO_2$ turbine power generation system that can be easily prevented from reaching an overspeed condition. A $CO_2$ turbine power generation system of an embodiment includes a $CO_2$ medium shutoff valve installed in a medium flow path between a regenerative heat exchanger and a combustor. When load rejection is to be performed, the $CO_2$ medium shutoff valve closes to shut off the supply of the medium from the regenerative heat exchanger to the combustor.

4 Claims, 4 Drawing Sheets

CO2 TURBINE POWER GENERATION SYSTEM

CROSS REFERENCE TO RELATED APPLICATIONS

This application is based upon and claims the benefit of priority from Japanese Patent Application No. 2020-098597, filed on Jun. 5, 2020; the entire contents of which are incorporated herein by reference.

FIELD

Embodiments of the present invention relate to a $CO_2$ turbine power generation system.

BACKGROUND

A $CO_2$ turbine power generation system is configured to generate power with a supercritical $CO_2$ working medium introduced to a single $CO_2$ turbine from a combustor.

In the $CO_2$ turbine power generation system, the medium discharged from the $CO_2$ turbine is supplied through a regenerative heat exchanger and so on to a $CO_2$ pump, where the pressure of the medium is boosted to a supercritical pressure. The medium whose pressure has been boosted to the supercritical pressure by the $CO_2$ pump flows into the combustor after heated in the regenerative heat exchanger by the heat of a medium discharged from the $CO_2$ turbine. Thereafter, the supercritical medium is introduced as the working medium from the combustor to the $CO_2$ turbine as described above. The $CO_2$ turbine power generation system thus forms a cycle in which the medium from the $CO_2$ turbine returns to the $CO_2$ turbine after sequentially flowing through its components.

The execution of load rejection in the $CO_2$ turbine power generation system because of trouble in an electric power system or other reasons may cause the $CO_2$ turbine power generation system to reach an overspeed condition in which a rotary shaft of the $CO_2$ turbine rotates at an over-rotation speed exceeding a rated rotation speed. The over-rotation speed differs depending on each piping system, turbine layout, the volume of an internal structure, and a residual working fluid. If the over-rotation speed is high, rotary bodies such as a turbine rotor and rotor blades are given great force to have an increased possibility of incurring damage and the like.

A problem to be solved by the present invention is to provide a $CO_2$ turbine power generation system that can be easily prevented from reaching an over-rotation speed condition.

DETAILED DESCRIPTION

A $CO_2$ turbine power generation system of an embodiment includes a combustor, a $CO_2$ turbine, a power generator, a regenerative heat exchanger, a cooler, a moisture separator, and a $CO_2$ pump. The $CO_2$ turbine is driven by a supercritical medium supplied from the combustor. The power generator is caused to generate power by the driving of the $CO_2$ turbine. The medium discharged from the $CO_2$ turbine flows into the regenerative heat exchanger. The cooler cools the medium flowing into the cooler from the $CO_2$ turbine through the regenerative heat exchanger. The moisture separator separates water from the medium discharged from the cooler. The $CO_2$ pump boosts a pressure of the medium from which the water has been separated by the moisture separator. Here, the medium whose pressure has been boosted to the supercritical pressure by the $CO_2$ pump flows into the combustor after heated in the regenerative heat exchanger by heat of a medium discharged from the $CO_2$ turbine. The $CO_2$ turbine power generation system of the embodiment further includes a $CO_2$ medium shutoff valve installed in a medium flow path between the regenerative heat exchanger and the combustor. When load rejection is to be performed, the $CO_2$ medium shutoff valve closes to shut off the supply of the medium from the regenerative heat exchanger to the combustor.

A $CO_2$ turbine power generation system according to an embodiment will be described using FIG. 1.

Figure 1:
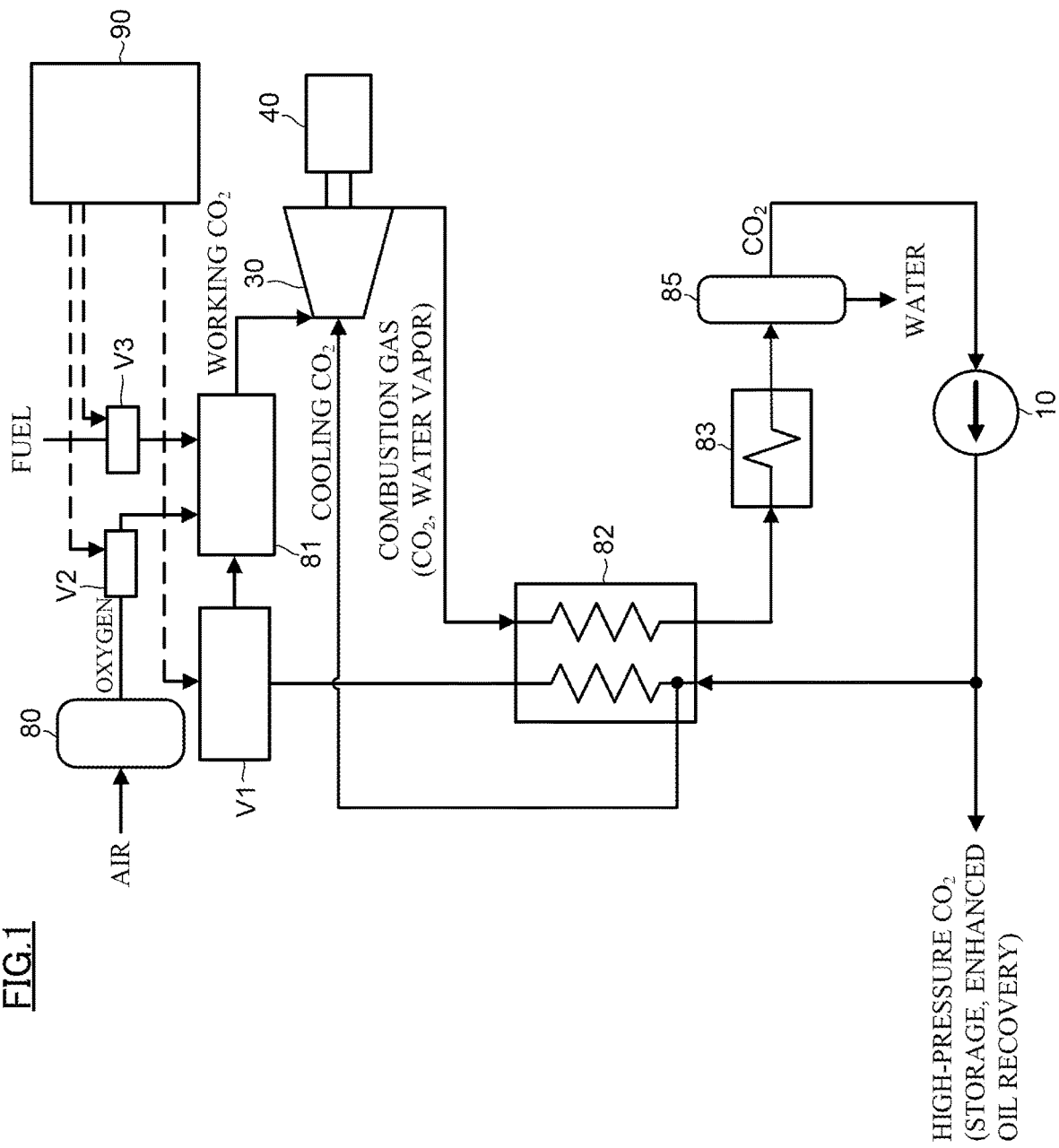
FIG. 1 is a diagram schematically illustrating the overall configuration of a $CO_2$ turbine power generation system according to an embodiment.

As illustrated in FIG. 1, components of the $CO_2$ turbine power generation system of this embodiment are configured to form a semi-closed cycle that uses a supercritical $CO_2$ medium as a working medium. The components constituting the $CO_2$ turbine power generation system of this embodiment will be described in sequence.

In the $CO_2$ turbine power generation system of this embodiment, as the working medium, a supercritical medium (working $CO_2$) discharged from a combustor 81 is supplied to a $CO_2$ turbine 30. Then, the working medium expands to work in the $CO_2$ turbine 30, thereby causing a rotary shaft (turbine rotor) of the $CO_2$ turbine 30 to rotate. The medium discharged from the $CO_2$ turbine 30 flows into a regenerative heat exchanger 82.

A power generator 40 is caused to generate power by the driving of the $CO_2$ turbine 30. Here, a rotary shaft of the power generator (power generator rotor) is coupled to the rotary shaft of the $CO_2$ turbine 30, and the rotation of the rotary shaft of the $CO_2$ turbine 30 then rotates the rotary shaft of the power generator 40 to cause the power generation in the power generator 40.

The medium discharged from the $CO_2$ turbine 30 and a medium discharged from a $CO_2$ pump 10 flow into the regenerative heat exchanger 82, where these mediums are heat-exchanged with each other. Here, the medium discharged from the $CO_2$ turbine 30 is cooled by the heat exchange in the regenerative heat exchanger 82. On the other hand, the medium discharged from the $CO_2$ pump 10 is heated by the heat exchange in the regenerative heat exchanger 82 and is supplied to the combustor 81.

A cooler 83 cools the medium heat-exchanged in the regenerative heat exchanger 82 after discharged from the $CO_2$ turbine 30. Consequently, in the cooler 83, water vapor contained in the medium discharged from the regenerative heat exchanger 82 is condensed.

A moisture separator 85 is supplied with the medium discharged from the cooler 83. The moisture separator 85 separates, from the supplied medium, water (liquid-phase water) produced as a result of the condensation in the cooler

83. The separated water is discharged to the outside from the moisture separator 85. Consequently, in the moisture separator 85, a medium containing high-purity $CO_2$ is obtained.

The $CO_2$ pump 10 is supplied with the medium being the high-purity $CO_2$ from the moisture separator 85 and boosts the pressure of the supplied medium to a supercritical pressure. Part of the medium whose pressure has been boosted by the $CO_2$ pump 10 is discharged to the outside to be used for storage, enhanced oil recovery, and so on, for instance. Here, for example, the amount of $CO_2$ discharged to the outside corresponds to an incremental amount of $CO_2$ in the combustion in the combustor 81. Then, the remainder of the medium whose pressure has been boosted by the $CO_2$ pump 10 is supplied to the regenerative heat exchanger 82 to be heated as described above.

Of the medium, part extracted from the middle of the regenerative heat exchanger 82 is supplied as a cooling medium (cooling $CO_2$) to the $CO_2$ turbine 30. The remaining medium having passed through the regenerative heat exchanger 82 is introduced to the combustor 81. That is, the medium whose pressure has been boosted by the $CO_2$ pump 10 is heated in the regenerative heat exchanger 82 by being heat-exchanged with the medium discharged from the $CO_2$ turbine 30 and thereafter flows into the combustor 81.

In a medium flow path between the regenerative heat exchanger 82 and the combustor 81, a $CO_2$ medium shutoff valve V1 is installed. The $CO_2$ medium shutoff valve V1 is intended to shut off the supply of the medium from the regenerative heat exchanger 82 to the combustor 81 when load rejection is to be performed.

Further, compressed oxygen produced from the air in an oxygen generator 80 is supplied to the combustor 81 through an oxygen shutoff valve V2. Together with the oxygen, a fuel such as natural gas is supplied to the combustor 81 through a fuel shutoff valve V3. In the combustor 81, the fuel reacts with the oxygen to burn.

The $CO_2$ turbine power generation system includes a control part 90 besides the above-described components. The control part 90 includes an arithmetic unit (not illustrated) and a memory device (not illustrated) and is configured such that the arithmetic unit performs arithmetic processing using a program stored in the memory device, though this configuration is not illustrated.

The control part 90 controls the operations of the $CO_2$ medium shutoff valve V1, the oxygen shutoff valve V2, and the fuel shutoff valve V3.

In this embodiment, the control part 90 fully closes the $CO_2$ medium shutoff valve V1 when the load rejection of shutting off a load to the power generator 40 is to be performed because of the occurrence of trouble in an electric power system or other reasons. The control part 90 thus makes the $CO_2$ medium shutoff valve V1 shut off the supply of the medium from the regenerative heat exchanger 82 to the combustor 81.

Similarly, when the load rejection is to be performed, the control part 90 fully closes the oxygen shutoff valve V2 and also fully closes the fuel shutoff valve V3. The control part 90 thus makes the oxygen shutoff valve V2 shut off the supply of the oxygen from the oxygen generator 80 to the combustor 81 and also makes the fuel shutoff valve V3 shut off the supply of the fuel to the combustor 81.

As described above, in the $CO_2$ turbine power generation system of this embodiment, when the load rejection is to be performed, the $CO_2$ medium shutoff valve V1 closes to shut off the supply of the medium from the regenerative heat exchanger 82 to the combustor 81. This results in a reduction in the amount of the medium flowing from the combustor 81 to the $CO_2$ turbine 30, making it possible to prevent the $CO_2$ turbine 30 from reaching an overspeed condition.

Even after the $CO_2$ medium shutoff valve V1 closes, the medium remaining in the medium flow path (pipe) between the $CO_2$ medium shutoff valve V1 and the combustor 81 contributes to the over-rotation speed. Here, the larger the amount of the medium remaining in the pipe flow path between the $CO_2$ medium shutoff valve V1 and the combustor 81, the higher the over-rotation speed. Therefore, the volume of the flow path between the $CO_2$ medium shutoff valve V1 and the combustor 81 is preferably small. Therefore, the $CO_2$ medium shutoff valve V1 is preferably installed on a side closer to the combustor 81 in the flow path between the combustor 81 and the regenerative heat exchanger 82. For example, the $CO_2$ medium shutoff valve V1 is preferably installed immediately before the combustor 81.

The above embodiment describes the case in which the oxygen shutoff valve V2 and the fuel shutoff valve V3 are provided, but this is not restrictive. The oxygen shutoff valve V2 and the fuel shutoff valve V3 are desirably provided but are not indispensable.

Figure 2:
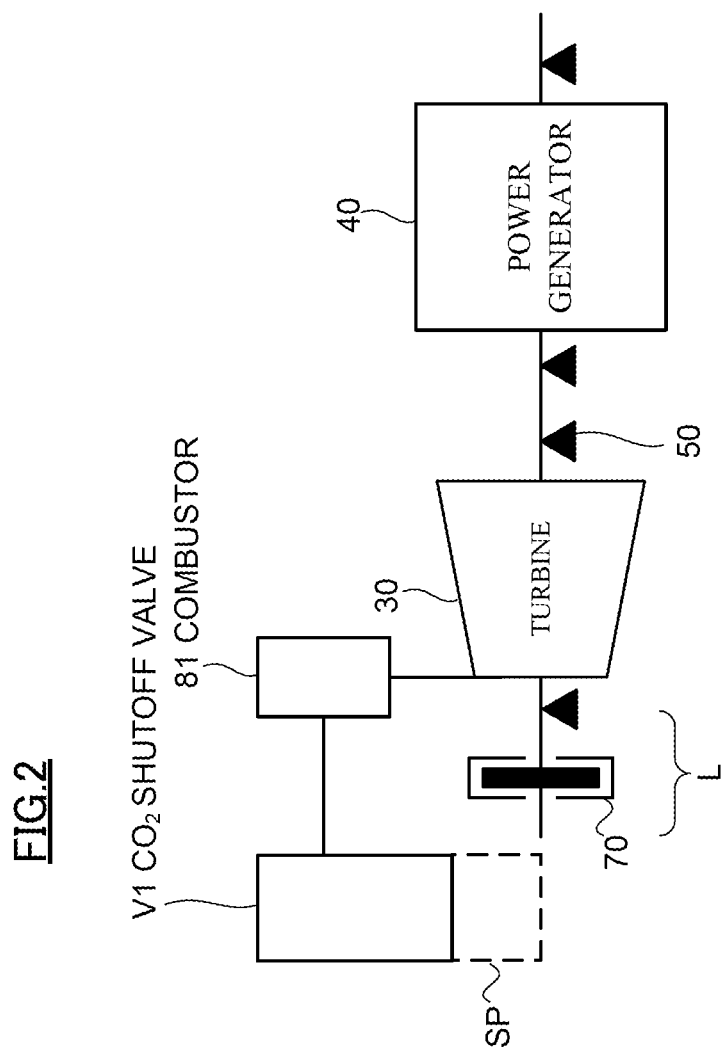
FIG. 2 is a diagram schematically illustrating an arrangement relationship in the $CO_2$ turbine power generation system according to the embodiment.

A suitable arrangement relationship in the $CO_2$ turbine power generation system of this embodiment will be hereinafter described using FIG. 2. FIG. 2 illustrates the arrangement relationship of the $CO_2$ turbine 30, the power generator 40, the combustor 81, and the $CO_2$ medium shutoff valve V1 out of the components of the $CO_2$ turbine power generation system of this embodiment.

As illustrated in FIG. 2, in the $CO_2$ turbine power generation system of this embodiment, the $CO_2$ turbine 30 and the power generator 40 are coaxial, and the rotary shaft of the $CO_2$ turbine 30 and the rotary shaft of the power generator 40 are rotatably supported using radial bearings 50.

The $CO_2$ turbine power generation system of this embodiment further includes a thrust bearing 70 as illustrated in FIG. 2. The power generator 40 is installed on one end side (right side in FIG. 2) of the rotary shaft of the $CO_2$ turbine 30, and the thrust bearing 70 is installed on the other end side (left side in FIG. 2) opposite the one end side. The $CO_2$ turbine 30 is an axial flow turbine where the working medium flows from the thrust bearing 70 side toward the power generator 40 side, and the thrust bearing 70 is installed on an upstream side, of the $CO_2$ turbine 30, where the thermal expansion amount is large. Further, the combustor 81 is disposed at a position that is upstream of the $CO_2$ turbine 30 and is more radially outward than the $CO_2$ turbine.

As illustrated in FIG. 2, the $CO_2$ medium shutoff valve V1 is installed in a space located on the other end side, of the $CO_2$ turbine 30, opposite the one end side where the power generator 40 is installed. Here, the $CO_2$ medium shutoff valve V1 is installed in a space located more on the other end side than the thrust bearing 70.

A wider space is easily available on the other end side of the $CO_2$ turbine 30 than on the one end side where the power generator 40 is installed. Therefore, in a case where a maintenance space SP where to perform the maintenance of the $CO_2$ medium shutoff valve V1 is set in a part located on the inner side of the $CO_2$ medium shutoff valve V1 in terms of the radial direction of the rotary shaft, the above-described arrangement allows for a wide space as the maintenance space SP. This can facilitate the disassembling and assembling of the $CO_2$ medium shutoff valve V1, enabling efficient maintenance work.

An arrangement relationship in a $CO_2$ turbine power generation system in a modification example of this embodiment will be described using FIG. 3. Similarly to FIG. 2, FIG. 3 illustrates the arrangement relationship of the $CO_2$ turbine 30, the power generator 40, the combustor 81, and the $CO_2$ medium shutoff valve V1 out of the components of the $CO_2$ turbine power generation system.

In the case where the rotary shaft of the $CO_2$ turbine 30 and the rotary shaft of the power generator 40 are directly connected and the distance between the pair of radial bearings 50 arranged between the $CO_2$ turbine 30 and the power generator 40 is short as illustrated in FIG. 2, unstable vibration may occur. The unstable vibration is ascribable to the radial-direction displacement of the rotary shafts due to thermal expansion.

Figure 3:
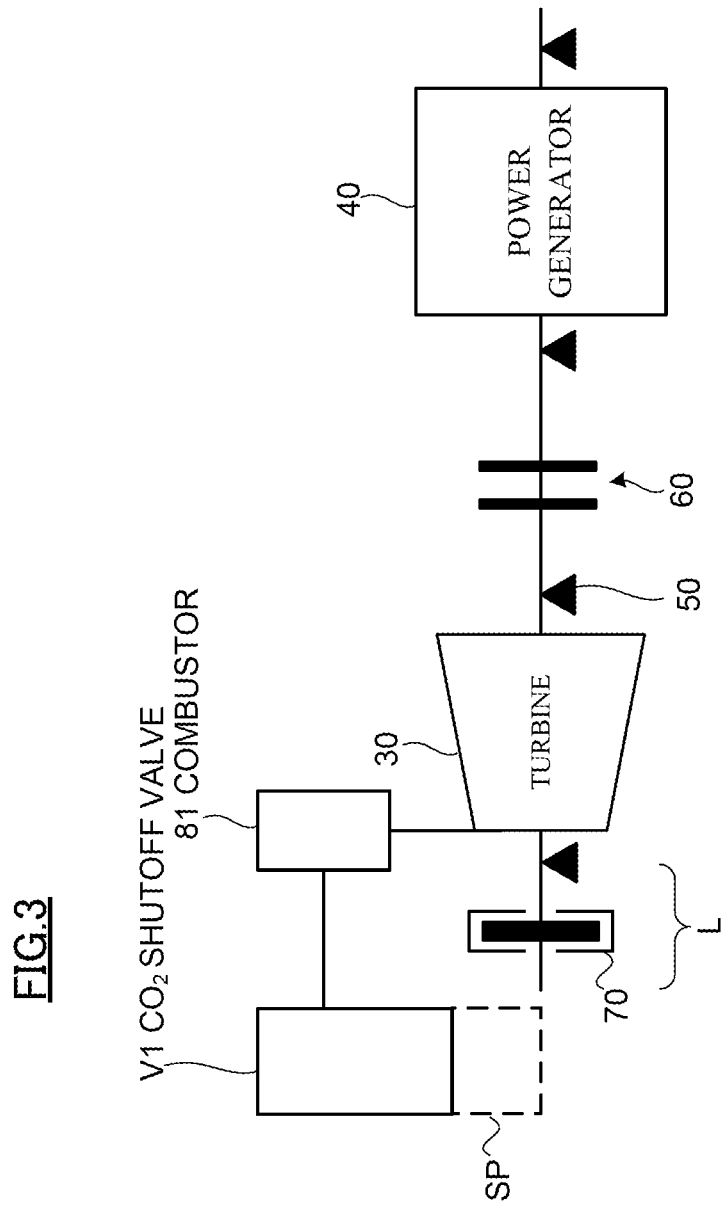
FIG. 3 is a diagram schematically illustrating an arrangement relationship in a $CO_2$ turbine power generation system according to a modification example of the embodiment.

In this modification example, on the other hand, the rotary shaft of the $CO_2$ turbine 30 and the rotary shaft of the power generator 40 are coupled using a diaphragm coupling 60 as illustrated in FIG. 3. Therefore, the operation of the diaphragm coupling 60 enables the absorption of a thermal deformation amount of thermal expansion or thermal contraction in the axial direction of the $CO_2$ turbine 30. As a result, this modification example not only has the effect exhibited in the above-described embodiment but also can reduce the occurrence of the unstable vibration.

A specific structure of the diaphragm coupling 60 will be described using FIG. 4.

Figure 4:
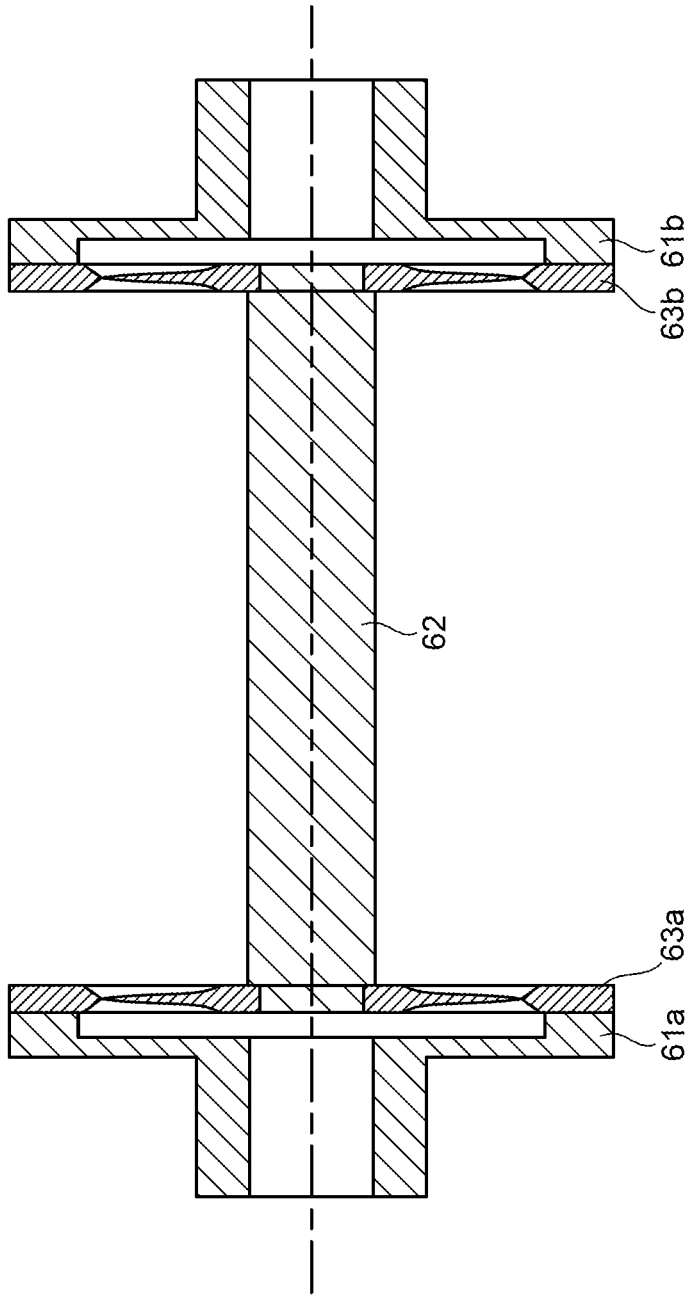
FIG. 4 is a sectional view schematically illustrating an example of a diaphragm coupling in the $CO_2$ turbine power generation system according to the modification example of the embodiment.

As illustrated in FIG. 4, the diaphragm coupling 60 includes a pair of flanges 61a, 61b and a center tube 62 sandwiched by the flanges 61a, 61b. A diaphragm 63a is between the flange 61a and the center tube 62, and a diaphragm 63b is between the other flange 61b and the center tube 62. The flange 61a is coupled to, for example, the rotary shaft of the power generator 40, and the other flange 61b is coupled to, for example, the rotary shaft of the $CO_2$ turbine 30.

In the diaphragm coupling 60, the diaphragms 63a, 63b are each formed of a metal thin plate, have high torsional stiffness for transmitting a rotational torque, and are shaped so as to be deformable in response to bending, compression, and so on. Therefore, the diaphragm coupling 60 is capable of accurately transmitting the rotational torque and owing to the elastic deformation of the diaphragms 63a, 63b, is also capable of absorbing the displacement of the rotary shafts caused by thermal elongation or the like.

Specifically, the diaphragm coupling 60 is configured to be contracted or elongated in the axial direction. Further, the diaphragm coupling 60 is configured such that the axis of the flange 61a and the axis of the other flange 61b become not coaxial with each other but parallel or tilted to each other. Note that the diaphragm coupling 60 is sometimes called a flexible coupling.

Others

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

10 . . . $CO_2$ pump, 30 . . . turbine, 40 . . . power generator, 50 . . . radial bearing, 60 . . . diaphragm coupling, 61a . . . flange, 61b . . . flange, 62 . . . center tube, 63a . . . diaphragm, 63b . . . diaphragm, 70 . . . thrust bearing, 80 . . . oxygen generator, 81 . . . combustor, 82 . . . regenerative heat exchanger, 83 . . . cooler, 85 . . . moisture separator, 90 . . . control part, V1 . . . $CO_2$ medium shutoff valve, V2 . . . oxygen shutoff valve, V3 . . . fuel shutoff valve

What is claimed is:

1. A $CO_2$ turbine power generation system comprising:
a combustor;
a $CO_2$ turbine driven by a supercritical medium supplied from the combustor;
a power generator caused to generate power by the driving of the $CO_2$ turbine;
a regenerative heat exchanger into which the medium discharged from the $CO_2$ turbine flows;
a cooler for cooling the medium flowing into the cooler from the $CO_2$ turbine through the regenerative heat exchanger;
a moisture separator for separating water from the medium discharged from the cooler; and
a $CO_2$ pump for boosting a pressure of the medium from which the water has been separated by the moisture separator,
wherein the medium whose pressure has been boosted to the supercritical pressure by the $CO_2$ pump flows into the combustor after heated in the regenerative heat exchanger by heat of a medium discharged from the $CO_2$ turbine, the $CO_2$ turbine power generation system further comprising
a $CO_2$ medium shutoff valve installed in a medium flow path between the regenerative heat exchanger and the combustor,
wherein the $CO_2$ medium shutoff valve is configured to close to shut off the supply of the medium from the regenerative heat exchanger to the combustor when load rejection is to be performed.

2. The $CO_2$ turbine power generation system according to claim 1, wherein the $CO_2$ medium shutoff valve is installed on a side closer to the combustor in the medium flow path between the regenerative heat exchanger and the combustor.

3. The $CO_2$ turbine power generation system according to claim 1, wherein the power generator is disposed on one end side of the $CO_2$ turbine, the $CO_2$ turbine power generation system further comprising a thrust bearing disposed on another end side, of the $CO_2$ turbine, opposite the one end side,
wherein the $CO_2$ medium shutoff valve is installed on the other end side of the $CO_2$ turbine.

4. The $CO_2$ turbine power generation system according to claim 1, further comprising a diaphragm coupling provided between a pair of bearings located between the $CO_2$ turbine and the power generator.

* * * * *